May 31, 1932.　　T. M. ZIMMERMAN　　1,860,797
MOTOR VEHICLE CABINET
Filed Dec. 27, 1930
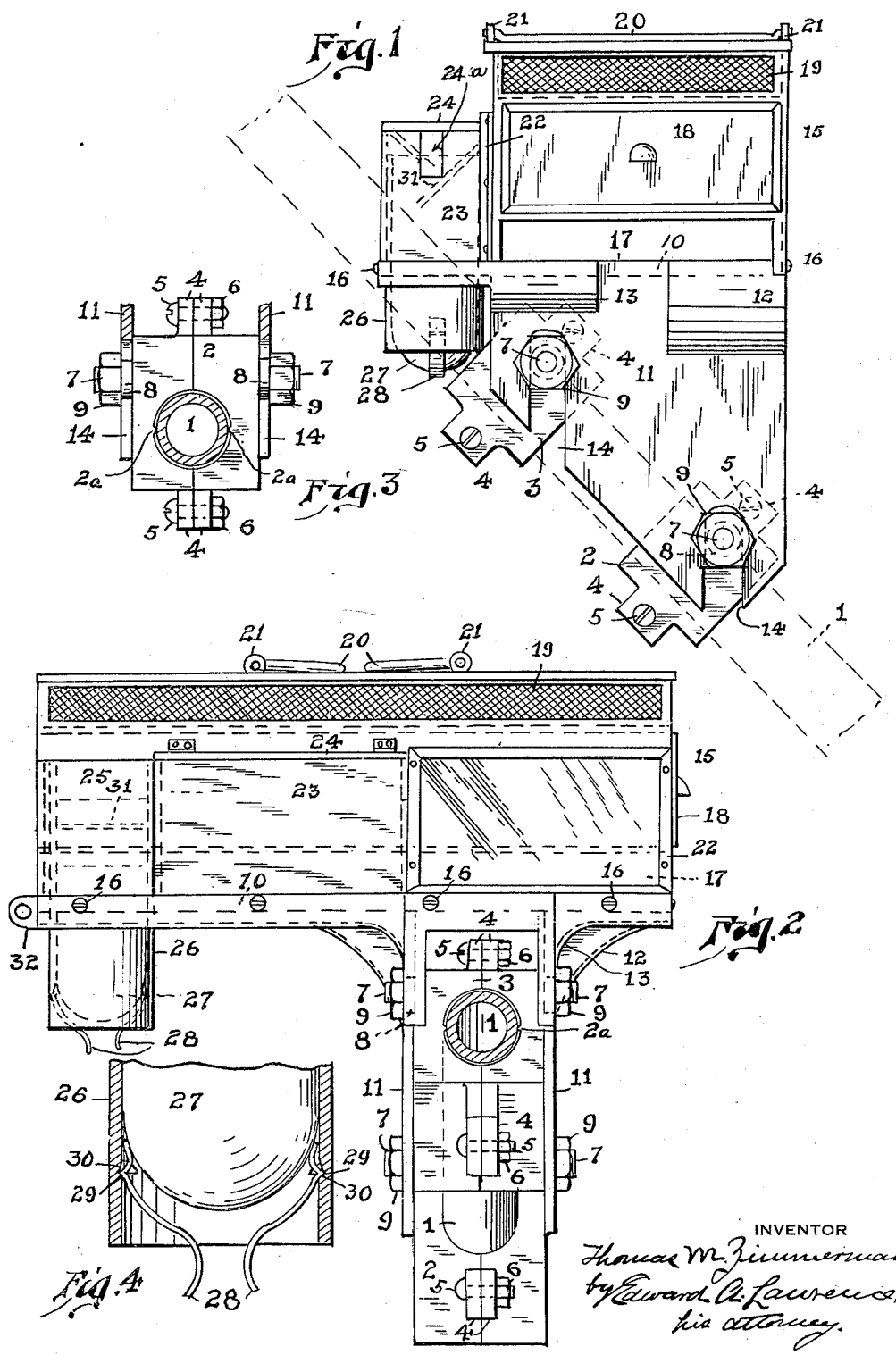
INVENTOR
Thomas M. Zimmerman,
by Edward A. Lawrence,
his attorney.

Patented May 31, 1932

1,860,797

UNITED STATES PATENT OFFICE

THOMAS M. ZIMMERMAN, OF DAWSON, PENNSYLVANIA

MOTOR VEHICLE CABINET

Application filed December 27, 1930. Serial No. 505,095.

The object which I have in view is the provision of means convenient to the operator of a motor vehicle whereby he may have within convenient access those articles and things of which he has need, such as maps, small tools, repair parts, tobacco in various forms and the like.

My improved cabinet is designed to be mounted on the steering post of the motor vehicle where it will be convenient to the user's hand and where it will be out of the way and will not obstruct the operator's vision.

Insomuch as the angle of the steering post varies greatly in different makes and in different types of motor vehicles, I provide new and improved means for adjustably supporting my cabinet so that it may always be horizontally disposed.

In connection with my cabinet I provide a new and improved type of receiver for ashes and cigarette and cigar butts and the like.

Other novel features of construction and also of arrangement of parts will appear from the following description.

In the accompanying drawings wherein I have illustrated a practical embodiment of the principles of my invention, Fig. 1 is a side elevation of the cabinet, the steering post being indicated in dotted lines.

Fig. 2 is a front elevation of the cabinet looking from the operator's seat, the steering post being shown in section.

Fig. 3 is an enlarged detail view of one of the split collars shown clamped on the steering post and the attachment of the supporting brackets thereto.

Fig. 4 is a broken vertical section on enlarged scale of the ash receiver and its mounting.

Referring to the drawings, 1 represents the steering post of a motor vehicle and 2 and 3 represent a pair of split collars which are clamped about the steering post in proper spaced relation to each other. The collar parts are of rectangular block form as best shown in Fig. 3, and are provided with mating flanges 4 which are pierced with alined bolt holes and 5 represent bolts which are inserted through the alined bolt holes and upon which the nuts 6 are screwed up to clamp the collars rigidly in place on the post.

The collar parts are provided at opposite points with the laterally extending studs 7, the inner portions of which are of enlarged diameter to form the cylindrical bosses 8, and the outer portions of which are reduced and threaded to receive the nuts 9. Thus an annular shoulder is formed between the inner and outer portions of the studs. The collar parts may be provided with internal spurs or teeth as shown at 2a for better gripping the steering post.

10 represents a flat platform which is intended to be horizontally disposed and from the underside of which depend the parallel supporting brackets 11 which are substantially perpendicular to the platform and which are spaced apart so as to straddle the split collars as indicated in Figs. 2 and 3. To better support the platform and to render the structure rigid I provide the curved metal braces 12 and 13 in the angles between the brackets and the platform. The bottom edges of the brackets are inclined substantially as shown in Fig. 1.

Adjacent to their front and rear vertical edges the brackets 11 are provided with apertures 14 extending up from their bottom edges and vertically elongated. Said apertures are of the width so that the brackets 11 may straddle the bosses of the studs 7. When the nuts 9 are screwed up on the studs against the brackets the brackets and platform are rigidly but detachably clamped to the steering post.

By loosening the nuts 9 the platform may be raised or lowered relative to the steering post and also may be properly leveled regardless of the angle of the steering post. When the nuts are again tightened the platform is rigidly held in position.

The platform 10 is set back slightly at its front and rear edges. The cabinet 15 which may be of wood or other suitable material is provided with front and rear walls which extend down past the platform and rest on the upper ends of the brackets, and screws 16 may be used to attach the cabinet to the edges of the platform. However the cabinet may be otherwise attached to the platform in any convenient manner.

The platform and the brackets may be formed of plate metal or metal cast integrally.

The lower portion of the cabinet is open at one side, preferably at the right hand side of the operator to form a shelf 17, the floor of which may be the platform 10. This shelf may be used to store maps, circular folders and other like articles. Above the shelf 17 is the sliding drawer 18, the drawer being open in the same direction as the shelf. This drawer 18 may be used for containing articles for use in connection with the vehicle or in an emergency, such as pliers, small wrenches, screw drivers, extra spark plugs and light bulbs, first aid packets, &c.

Above the position of the drawer 18 the top of the cabinet is formed as an open tray which may have low woven wire sides 19. This tray may be used for carrying articles and is provided with a pair of wire bails 20 pivoted at their ends to the low stands 21 mounted on the side walls of the tray, which bails may be turned down over articles placed on the tray to hold them in place.

At one side of the front of the cabinet 15 the wall is provided with the sheet metal flanges 22 to hold the vehicle license card.

23 represents a box which occupies the middle portion of the front of the cabinet and which may be integral with or attached to the front wall of the cabinet. The top of the box 23 is preferably lower than that of the tray 19. The box may be used to hold pipes, cigars, cigarettes, tobacco and other articles or materials for the convenience and comfort of the operator. The box is provided with a lid 24 which may be hinged as shown or may be slidably mounted on the box. The exposed end wall of the box 23 is provided with a vertically extended opening 24a so that the stems of pipes too long for the box may protrude therethrough.

At the opposite end of the box from the license card holder is an open top compartment 25, and 26 is a vertically disposed tubular metal holder mounted in said compartment and having its lower end extending down through the floor of the compartment.

27 represents an ash and butt cup which is contained in said holder, being slipped upwardly into place through the bottom of the holder, the cup being provided with a pair of depending spring-metal fingers 28 having angular humps 29 so that by compressing the fingers 28 together the cup may be slid up into the holder and the fingers are then allowed to expand so that the humps 29 on said fingers spring into seats 30 cut or formed in the wall of the holder. By compressing the fingers together the cup may be released from the holder and may be emptied and may then be replaced. The upper interior of the tubular holder is provided with vertically staggered deflector plates 31 which prevent the flying upward of the contents of the cup.

The brackets 11 are positioned toward the right hand end of the platform 10 so that the cabinet does not in any way obstruct the operator's vision of the instrument board and the cabinet and platform are set high enough so as not to interfere with the operator's access to the operating levers and pedals.

32 represents a pierced bracket extending from the left end of the platform 10 so that a bracing strut may be attached and extend to a portion of the vehicle to further steady the cabinet if necessary.

It is obvious that my improved cabinet forms a very convenient and desirable accessory for motor vehicles. The operator has conveniently at hand the articles and supplies that he is most likely to need or desire and can thus supply his wants without stopping the travel of the vehicle or leaving his seat.

The cabinet may be mounted at any desired elevation and may be adjusted in a properly level relation on a steering post set at any angle to the vertical.

The device is small and compact, in nowise interfering with the operation of the vehicle nor with the operator's view. It is inexpensive to make and therefore may be sold at a reasonable price, and it is substantial and durable.

What I claim is:—

1. A cabinet adapted to be mounted on the steering post of a motor vehicle and comprising a lidded box, a tubular holder vertically disposed with said box and opening through the bottom of the box, a receiving cup arranged to be upwardly inserted in said holder, and spring fingers attached to said cup and arranged to resiliently hold said cup in said holder.

2. A cabinet adapted to be mounted on the steering post of a motor vehicle and comprising a box, a tubular holder vertically disposed with said box and opening through the bottom of the box, a receiving cup arranged to be upwardly inserted in said holder, and spring-means for holding the cup in place.

Signed at Pittsburgh, Pa., this 26th day of December, 1930.

THOMAS M. ZIMMERMAN.